(12) United States Patent
Sun

(10) Patent No.: US 9,189,245 B2
(45) Date of Patent: Nov. 17, 2015

(54) MOTHERBOARD IN A SERVER

(71) Applicants: Inventec (Pudong) Technology Corporation, Shanghai (CN); Inventec Corporation, Taipei (TW)

(72) Inventor: Yan-Long Sun, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 391 days.

(21) Appl. No.: 13/775,551

(22) Filed: Feb. 25, 2013

(65) Prior Publication Data

US 2014/0156986 A1 Jun. 5, 2014

(30) Foreign Application Priority Data

Nov. 30, 2012 (CN) .......................... 2012 1 0501412

(51) Int. Cl.
G06F 15/177 (2006.01)
G06F 9/44 (2006.01)
G06F 1/18 (2006.01)

(52) U.S. Cl.
CPC .............. *G06F 9/4403* (2013.01); *G06F 1/184* (2013.01); *G06F 9/4405* (2013.01)

(58) Field of Classification Search
CPC ....... G06F 9/4403; G06F 1/84; G06F 9/4401; G06F 15/177; G06F 9/4405
See application file for complete search history.

(56) References Cited

U.S. PATENT DOCUMENTS

| | | | | |
|---|---|---|---|---|
| 6,185,652 | B1* | 2/2001 | Shek et al. ..................... | 710/263 |
| 8,862,862 | B2* | 10/2014 | Zimmer et al. .................. | 713/1 |
| 2004/0024893 | A1* | 2/2004 | Rajamony et al. ............ | 709/230 |
| 2011/0113225 | A1 | 5/2011 | Lu et al. | |

FOREIGN PATENT DOCUMENTS

| | | |
|---|---|---|
| CN | 101872213 A | 10/2010 |
| CN | 102520768 A | 6/2012 |
| TW | 201218931 | 5/2012 |

\* cited by examiner

*Primary Examiner* — Fahmida Rahman
(74) *Attorney, Agent, or Firm* — Huffman Law Group, PC

(57) ABSTRACT

A server comprises a first motherboard module. The first motherboard module comprises a first motherboard, a first CPU, at least one first memory module, a chipset, input/output units, a BIOS unit and a first QPI connector. The first CPU is disposed on the first motherboard. The first memory module electrically couples with the first CPU. The chipset electrically couples with the first CPU. The input/output units electrically couple with the chipset. The BIOS unit electrically couples with the chipset. The first QPI connector electrically couples with the first CPU through a QPI bus. The first QPI connector is connected to a second motherboard module.

9 Claims, 2 Drawing Sheets

MOTHERBOARD IN A SERVER

RELATED APPLICATIONS

This application claims priority to China Application Serial Number 201210501412.4, filed Nov. 30, 2012, which is herein incorporated by reference.

TECHNICAL FIELD

The present disclosure relates to a server, and more particularly to a motherboard in a server, in which the motherboard is formed by at least one motherboard module.

BACKGROUND

Following the rapid development of computer and Internet technology, the Internet has become the most important medium for users to access information. Because of the use of the Internet, Internet-related businesses must purchase many servers to provide services to users.

Typically, a motherboard of a server is designed having a single CPU or a number of CPUs. Although a motherboard having a number of CPUs can process a variety of procedures simultaneously, the cost of such a motherboard is high. Therefore, with cost considerations in mind, most companies generally purchase a motherboard with a single CPU. When the processing speed of the motherboard with a single CPU does not match users' requirements, such companies subsequently purchase a motherboard with a number of CPUs to match the new requirements. However, because of the incompatibility among different motherboards, the original motherboard with a single CPU has to be discarded, which is wasteful.

SUMMARY

The present invention provides a motherboard module for a server. The motherboard module has a CPU. A plurality of such motherboard modules may be connected together to increase the number of CPUs. The motherboard modules that are connected together act as a motherboard of a server.

The present invention discloses a server. The server comprises a first motherboard module and a second motherboard module. The first motherboard module comprises a first motherboard, a first CPU, at least one first memory module, a chipset, input/output units, a BIOS unit, and a first QPI connector. The first CPU is disposed on the first motherboard. The first memory module electrically couples with the first CPU. The chipset electrically couples with the first CPU. The input/output units electrically couple with the chipset. The BIOS unit electrically couples with the chipset. The first QPI connector electrically couples with the first CPU through a QPI bus. The second motherboard module comprises a second motherboard, a second CPU, at least one second memory module and a second QPI connector. The second CPU is disposed on the second motherboard. The second memory module electrically couples with the second CPU. The second QPI connector electrically couples with the second CPU through a QPI bus. The second motherboard is coupled to the first motherboard when the second QPI connector is electrically coupled to the first QPI connector.

In an embodiment, when the second motherboard is not coupled to the first motherboard and when the server is powered on, the BIOS unit initiates the first CPU, the at least one first memory module, and the input/output units, and sets an operation mode of the server in a first mode. When the server is operated in the first mode, the first CPU processes a plurality of data processing tasks issued by input/output units through corresponding input/output units.

In an embodiment, when the second motherboard is coupled to the first motherboard and when the server is powered on, the BIOS unit detects the second CPU. The BIOS unit initiates the first CPU, the at least one first memory module, the input/output units, the second CPU, and the at least one second memory module, and sets an operation mode of the server in a second mode. When the server is operated in the second mode, the first CPU receives a plurality of data processing tasks issued by input/output units through corresponding input/output units. The first CPU assigns one or more data processing tasks to the second CPU through the QPI bus. After the second CPU finishes processing the one or more data processing tasks, the second CPU sends corresponding one or more data processing results to the first CPU. The first CPU transfers the one or more data processing results to corresponding input/output units.

In an embodiment, the second motherboard module further comprises a PCIE unit electrically coupling with the second CPU. When the server is operated in the second mode, the first CPU assigns another data processing task to the second CPU through the QPI bus. After the second CPU finishes processing the another data processing task, the second CPU sends a corresponding data processing result to the PCIE unit.

In an embodiment, the first motherboard module further comprises a power output connector. The second motherboard module further comprises a corresponding power input connector. When the second motherboard is coupled to the first motherboard, the power input connector is electrically coupled to the power output connector to supply power to the second CPU and the at least one second memory module of the second motherboard module.

In an embodiment, the second motherboard module further comprises at least one sensing device and a second sensing signal connector. The first motherboard module further comprises a first sensing signal connector. When the second motherboard is coupled to the first motherboard, the second sensing signal connector is electrically coupled to the first sensing signal connector. When the server is powered on, the BIOS unit initiates the sensing device through the first sensing signal connector and the second sensing signal connector and collects data of the sensing device while the server is working.

In an embodiment, the second motherboard module further comprises at least one sensing device and a second sensing signal connector. The first motherboard module further comprises an ILO and a first sensing signal connector. When the second motherboard is coupled to the first motherboard, the second sensing signal connector is electrically coupled to the first sensing signal connector. When the ILO detects the sensing device, the ILO controls the sensing device to operate and collects data of the sensing device through the second sensing signal connector and the first sensing signal connector.

In an embodiment, the second CPU and the at least one second memory module are disposed on a first surface of the second motherboard. The second QPI connector is disposed on a second surface of the second motherboard. The first surface is opposite to the first surface. The first CPU, the at least one first memory module, and the first QPI connector are disposed on a same surface of the first motherboard. When the second QPI connector is coupled to the first QPI connector, the second motherboard is arranged over and parallel to the first motherboard.

In an embodiment, supports are disposed on the second surface of the second motherboard. The supports are fixed on the first motherboard, such that the second motherboard is positioned over the first motherboard. One of the supports has a hollow structure. When the support with a hollow structure is fixed on the first motherboard, the second QPI connector and the first QPI connector are connected together in the hollow structure of the support.

The present invention also discloses a server. The server comprises a first motherboard module. The first motherboard module comprises a first motherboard, a first CPU, at least one first memory module, a chipset, input/output units, a BIOS unit, and a first QPI connector. The first CPU is disposed on the first motherboard. The first memory module electrically couples with the first CPU. The chipset electrically couples with the first CPU. The input/output units electrically couple with the chipset. The BIOS unit electrically couples with the chipset. The first QPI connector electrically couples with the first CPU through a QPI bus. The first QPI connector is connected to a second motherboard module. When the server is powered on, the first CPU receives a plurality of data processing tasks issued by input/output units through corresponding input/output units. The first CPU assigns one or more data processing tasks to the second motherboard module through the QPI bus. After the second motherboard module finishes processing the one or more data processing tasks, the second motherboard module sends corresponding one or more data processing results to the first CPU. The first CPU transfers the one or more data processing results to corresponding input/output units.

Accordingly, when the processing speed is too slow because there is an insufficient number of CPUs in a motherboard, an additional motherboard module can be connected to this motherboard to increase the number of CPUs. Moreover, when a CPU in a motherboard module fails, it is necessary only to replace that particular motherboard module with a new motherboard module, rather than replace the whole motherboard. Therefore, costs can be reduced significantly.

BRIEF DESCRIPTION OF THE DRAWINGS

In order to make the foregoing as well as other aspects, features, advantages, and embodiments of the present disclosure more apparent, the accompanying drawings are described as follows.

DETAILED DESCRIPTION

Figure 1:
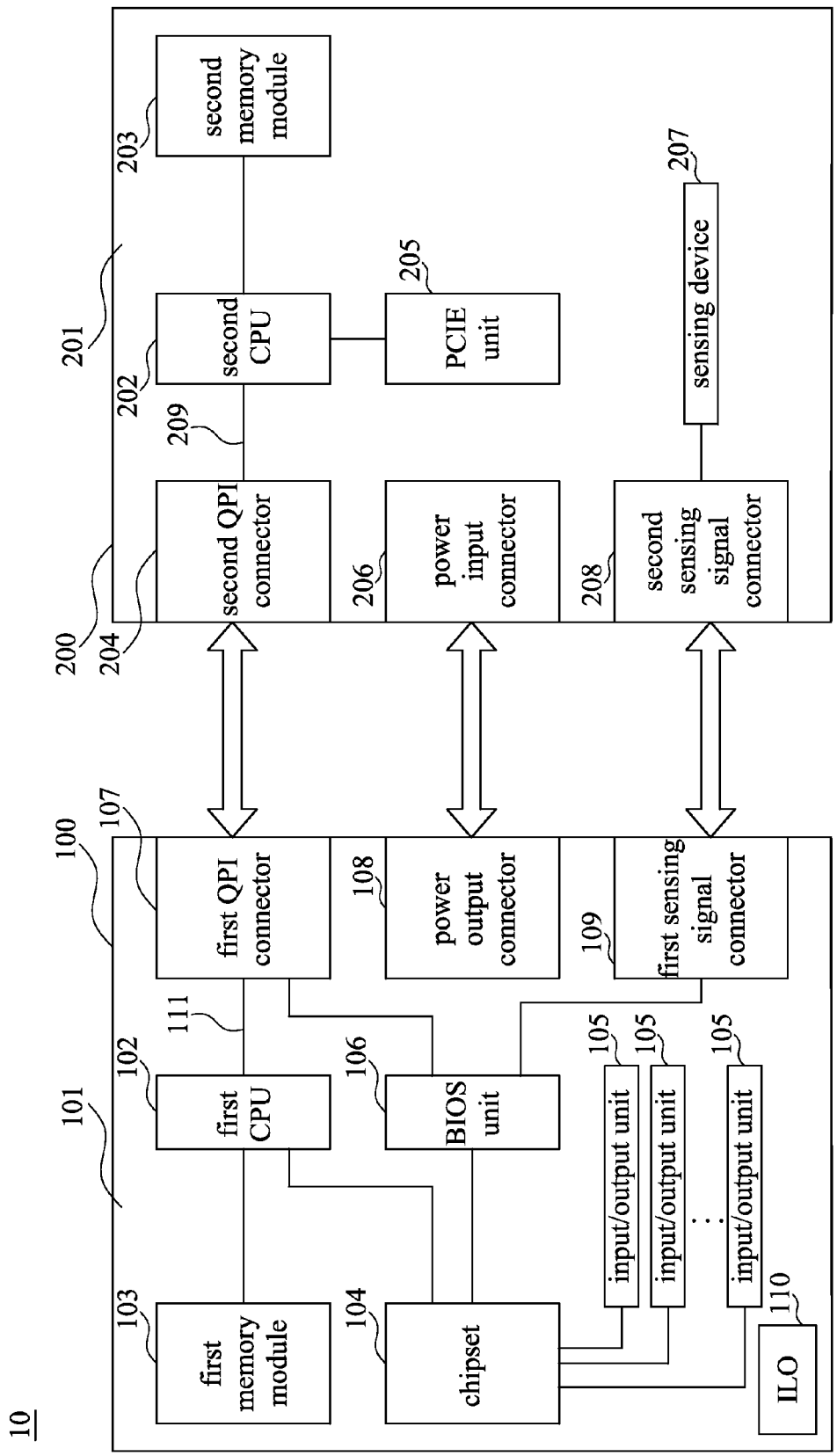
FIG. 1 is a schematic block diagram of a server in accordance with an embodiment.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a schematic block diagram of a server in accordance with an embodiment. The server 10 includes a first motherboard module 100 and a second motherboard module 200. It is noted that, in this embodiment, two motherboard modules are disposed in a server to explain this invention. However, in another embodiment, more than two motherboard modules may be disposed in a server.

The first motherboard module 100 comprises a first motherboard 101, a first central processing unit (CPU) 102, at least one first memory module 103, a chipset 104, input/output units 105, a basic input/output system (BIOS) unit 106, and a first quick path interconnect (QPI) connector 107. The first CPU 102 is disposed on the first motherboard 101. The first memory module 103 electrically couples with the first CPU 102. In this embodiment, the first memory module 103 is a memory to store parameters for the first CPU 102. The chipset 104 electrically couples with the first CPU 102. The input/output units 105 electrically couple with the chipset 104. In this embodiment, the chipset 104 is a south/north bridge chipset. The chipset 104 transforms the signals between the first CPU 102 and the input/output units 105. The BIOS unit 106 electrically couples with the chipset 104 to initiate a system when power supplied to the system is turned on. The first QPI connector 107 electrically couples with the first CPU 102 through a QPI bus 111.

The second motherboard module 200 comprises a second motherboard 201, a second central processing unit (CPU) 202, at least one second memory module 203, and a second quick path interconnect (QPI) connector 204. The second CPU 202 is disposed on the second motherboard 201. The second memory module 203 electrically couples with the second CPU 202. In this embodiment, the second memory module 203 is a memory to store parameters for the second CPU 202. The second QPI connector 204 electrically couples with the second CPU 202 through a QPI bus 209. In an embodiment, the second motherboard 201 is detachable with the first motherboard 101. The second motherboard 201 is coupled with the first motherboard 101 when the second QPI connector 204 is electrically coupled with the first QPI connector 107. In this case, both the second motherboard module 200 and the first motherboard module 100 act as a motherboard of the server 10. Therefore, there are two CPUs, namely, the first CPU 102 and the second CPU 202, in the server 10. In contrast, when the second motherboard 201 is not coupled with the first motherboard 101, only the first motherboard module 100 acts as a motherboard of the server 10. Therefore, in this case, there is only one CPU, namely, the first CPU 102, in the server 10. In other words, according to embodiments of this disclosure, a number of the CPUs in a server may be increased by coupling an additional motherboard module, or a number of the CPUs in a server may be decreased by decoupling one or more motherboard modules from the other motherboard module(s). Accordingly, a user can increase or decrease the number of the CPUs in a server according to system performance requirements.

In an embodiment, when the second motherboard 201 is not coupled to the first motherboard 101, only the first motherboard module 100 with the first CPU 102 acts as a motherboard of the server 10. Accordingly, when the server 10 is powered on, the BIOS unit 106 initiates the first CPU 102, the at least one first memory module 103 and the input/output units 105, and sets the operation mode of the server 10 in a first mode. When the server 10 is operated in the first mode, each input/output unit 105 issues a requirement signal for a data processing task to the chipset 104. Subsequently, the chipset 104 transforms this requirement signal into a signal that the first CPU 102 can read, and then transfers this transformed signal to the first CPU 102.

In another embodiment, when the second motherboard 201 is coupled to the first motherboard 101, both the second motherboard module 200 and the first motherboard module 100 act as a motherboard of the server 10. Therefore, there are two CPUs, namely, the first CPU 102 and the second CPU 202, in the server 10. Accordingly, when the server 10 is powered on, the BIOS unit 106 will detect the second CPU 202. Therefore, the BIOS unit 106 initiates not only the first CPU 102, the at least one first memory module 103 and the input/output units 105, but also the second CPU 202 and the at least one second memory module 203. Subsequently, the BIOS unit 106 sets the operation mode of the server 10 in a second mode. When the server 10 is operated in the second mode, each input/output device issues a requirement signal for a data processing task through the corresponding input/output unit 105 to the chipset 104. Subsequently, the chipset 104 transforms this requirement signal into a signal that the first CPU 102 can read, and then transfers this transformed signal to the first CPU 102. In this case, because the server has two CPUs, namely, the first CPU 102 and the second CPU 202, the first CPU 102 may assign one or more data processing tasks to the second CPU 202 to process the same through the QPI bus 111, the first QPI connector 107, the second QPI connector 204 and the QPI bus 209. After the second CPU 202 finishes processing the one or more data processing tasks, the second CPU 202 may send back the corresponding one or more data processing results to the first CPU 102 through the QPI bus 209, the second QPI connector 204, the first QPI connector 107 and the QPI bus 111. Subsequently, the first CPU 102 may transfer the received one or more data processing results to the input/output unit 105 that issued the requirement signal.

Moreover, the second motherboard module 200 further comprises a peripheral component interconnect express (PCIE) unit 205 to couple with a peripheral device. The PCIE unit 205 electrically couples with the second CPU 202. When the server 10 is operated in the second mode and after the first CPU 102 has assigned one or more data processing tasks to the second CPU 202 to process the same through the QPI bus 111, the first QPI connector 107, the second QPI connector 204, and the QPI bus 209, the second CPU 202 may send back the one or more data processing results to a peripheral device through the PCIE unit 205 after the second CPU 202 finishes processing the data processing tasks.

Moreover, in an embodiment, a power output connector 108 is disposed in the first motherboard module 100. A corresponding power input connector 206 is disposed in the second motherboard module 200 for receiving power from the power output connector 108. That is, when the second motherboard 201 couples with the first motherboard 101, the power input connector 206 is electrically connected to the power output connector 108. Therefore, the second CPU 202 of the second motherboard module 200 may get power form the first motherboard module 100 through the power input connector 206. In an embodiment, the power output connector 108 and the first QPI connector 107 of the first motherboard module 100 can be integrated together to form a single connector. Similarly, the power input connector 206 and the second QPI connector 204 of the second motherboard module 200 can be integrated together to form a single connector.

In another embodiment, at least one sensing device 207 is disposed in the second motherboard module 200 to sense environmental data. The sensing device 207 may be a temperature sensing device and/or a moisture sensing device. Moreover, a second sensing signal connector 208 is also disposed in the second motherboard module 200. A corresponding first sensing signal connector 109 is disposed in the first motherboard module 100 to connect with the second sensing signal connector 208 for receiving the environmental data sensed by the sensing device 207. Accordingly, when the second motherboard 201 couples with the first motherboard 101, the second sensing signal connector 208 is electrically connected to the first sensing signal connector 109. When the server 10 is powered on, the BIOS unit 106 will detect the sensing device 207. Subsequently, the BIOS unit 106 initiates the sensing device 207 through the first sensing signal connector 109 and the second sensing signal connector 208 so that the sensing device 207 senses environmental data while the server 10 is operated.

Figure 2A:
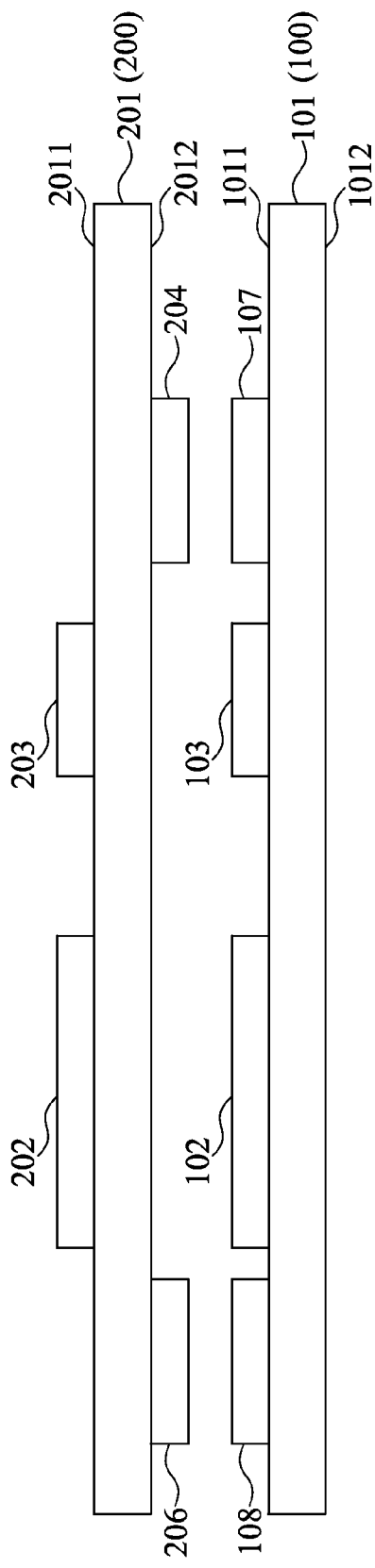
FIG. 2A is a schematic diagram of a side view of a first motherboard module configured with a second motherboard module in accordance with an embodiment.

In an embodiment, an integrated lights-out (ILO) 110 is also disposed on the first motherboard module 100. In this case, when the second motherboard 201 couples with the first motherboard 101, the second sensing signal connector 208 is electrically connected to the first sensing signal connector 109. When the ILO 110 detects the sensing device 207, the ILO 110 controls the sensing device 207 to sense environmental data. Subsequently, the sensing device 207 may send the sensed environmental data to the ILO 110 for further processing through the second sensing signal connector 208 and the first sensing signal connector 109. FIG. 2A is a schematic diagram of a side view of a first motherboard module configured with a second motherboard module in accordance with an embodiment. It is noted that not all units shown in FIG. 1 are drawn in FIG. 2A. However, a person of ordinary skill in the art may arrange other units not shown in FIG. 2A in a motherboard according to the invention.

The second motherboard 201 has a first surface 2011 and a second surface 2012 opposite to the first surface 2011. The second CPU 202 and the second memory module 203 are disposed on the first surface 2011 of the second motherboard 201. The second QPI connector 204 and the power input connector 206 are disposed on the second surface 2012 of the second motherboard 201.

The first motherboard 101 has a first surface 1011 and a second surface 1012 opposite to the first surface 1011. The first CPU 102, the first memory module 103, the first QPI connector 107 and the power output connector 108 are disposed on the first surface 1011 of the first motherboard 101. The second QPI connector 204 and the first QPI connector 107 are disposed opposing one another. Therefore, when the second QPI connector 204 couples with the first QPI connector 107, the second motherboard 201 is over and parallel to the first motherboard 101.

Figure 2B:
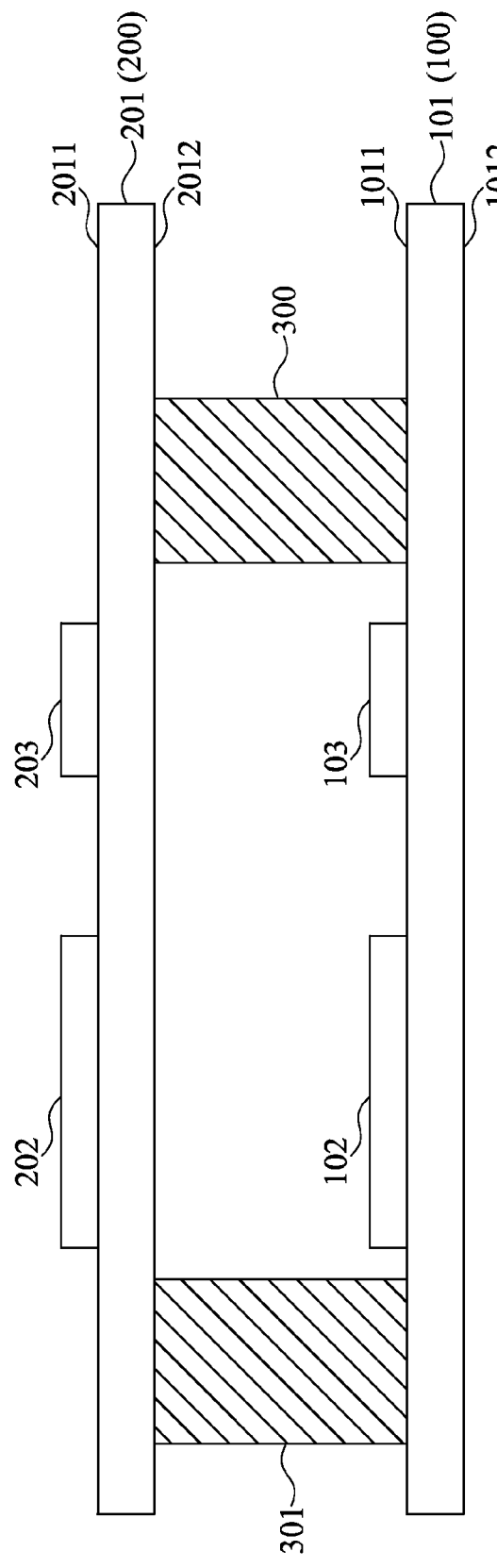
FIG. 2B is a schematic diagram of a side view of a first motherboard module configured with a second motherboard module in accordance with another embodiment.

FIG. 2B is a schematic diagram of a side view of a first motherboard module configured with a second motherboard module in accordance with another embodiment. In this embodiment, supports 300 and 301 are disposed on the second surface 2012 of the second motherboard 201. When the second motherboard 201 couples with the first motherboard 101, the supports 300 and 301 are fixed on the first surface 1011 of the first motherboard 101, such that the second motherboard 201 is positioned over the first motherboard 101. The support 300 has a hollow structure. The second QPI connector 204 is disposed in the hollow structure of the support 300. When the support 300 is fixed on the first surface 1011 of the first motherboard 101, the second QPI connector 204 and the first QPI connector 107 are connected together in the hollow structure of the support 300. In another embodiment, the support 301 also has a hollow structure. The power input connector 206 is disposed in the hollow structure of the support 301. When the support 301 is fixed on the first surface 1011 of the first motherboard 101, the power input connector 206 and power output connector 108 are connected together in the hollow structure of the support 301.

Accordingly, when the processing speed is too slow because there is an insufficient number of CPUs in a motherboard, an additional motherboard module can be connected to this motherboard to increase the number of CPUs. Moreover, when a CPU in a motherboard module fails, it is necessary only to replace that particular motherboard module with a new motherboard module, rather than replace the whole motherboard. Therefore, costs can be reduced significantly.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A server, comprising:
   a first motherboard module comprising:
      a first motherboard and a first CPU disposed on the first motherboard;
      at least one first memory module electrically coupling with the first CPU;
      a chipset electrically coupling with the first CPU;
      a plurality of input/output units electrically coupling with the chipset;
      a BIOS unit electrically coupling with the chipset; and
      a first QPI connector electrically coupling with the first CPU through a first QPI bus; and
   a second motherboard module comprising:
      a second motherboard and a second CPU disposed on the second motherboard;
      at least one second memory module electrically coupling with the second CPU; and
      a second QPI connector electrically coupling with the second CPU through a second QPI bus;
   wherein the second motherboard is coupled to the first motherboard when the second QPI connector is electrically coupled to the first QPI connector;
   wherein when the second motherboard is not coupled to the first motherboard and when the server is powered on, the BIOS unit initiates the first CPU, the at least one first memory module, and the input/output units and sets an operation mode of the server in a first mode;
   wherein when the server is operated in the first mode, the first CPU processes a plurality of data processing tasks issued by input/output units;
   wherein when the second motherboard is coupled to the first motherboard and when the server is powered on, the BIOS unit detects the second CPU, and the BIOS unit initiates the first CPU, the at least one first memory module, the input/output units, the second CPU, and the at least one second memory module, and sets an operation mode of the server in a second mode;
   wherein when the server is operated in the second mode, the first CPU receives a plurality of data processing tasks issued by input/output units and the first CPU assigns one or more data processing tasks to the second CPU through the second QPI bus, and after the second CPU finishes processing the one or more data processing tasks, the second CPU sends corresponding one or more data processing results to the first CPU, and the first CPU transfers the one or more data processing results to corresponding input/output units.

2. The server of claim 1, wherein the second motherboard module further comprises a PCIE unit electrically coupling with the second CPU, wherein when the server is operated in the second mode, the first CPU assigns another data processing task to the second CPU through the second QPI bus, and after the second CPU finishes processing the another data processing task, the second CPU sends a corresponding data processing result to the PCIE unit.

3. The server of claim 1, wherein the first motherboard module further comprises a power output connector, and the second motherboard module further comprises a power input connector, wherein when the second motherboard is coupled to the first motherboard, the power input connector is electrically coupled to the power output connector to supply power to the second CPU and the at least one second memory module of the second motherboard module.

4. The server of claim 3, wherein the second motherboard module further comprises at least one sensing device and a second sensing signal connector and the first motherboard module further comprises a first sensing signal connector, and when the second motherboard is coupled to the first motherboard, the second sensing signal connector is electrically coupled to the first sensing signal connector;
   wherein when the server is powered on, the BIOS unit initiates the sensing device through the first sensing signal connector and the second sensing signal connector and the server collects data of the sensing device while the server is working.

5. The server of claim 3, wherein the second motherboard module further comprises at least one sensing device and a second sensing signal connector, and the first motherboard module further comprises an ILO and a first sensing signal connector,
   wherein when the second motherboard is coupled to the first motherboard, the second sensing signal connector is electrically coupled to the first sensing signal connector, and when the ILO detects the sensing device, the ILO controls the sensing device to operate and collects data of the sensing device through the second sensing signal connector and the first sensing signal connector.

6. The server of claim 5, wherein the power output connector and the first QPI connector are integrated together to form a single connector, and the power input connector and the second QPI connector are integrated together to form a single connector.

7. The server of claim 3, wherein the second CPU and the at least one second memory module are disposed on a first surface of the second motherboard, and the second QPI connector is disposed on a second surface of the second motherboard, wherein the first surface is opposite to the first surface; and
   the first CPU, the at least one first memory module and the first QPI connector are disposed on a same surface of the first motherboard;
   wherein when the second QPI connector is coupled to the first QPI connector, the second motherboard is arranged over and parallel to the first motherboard.

8. The server of claim 7, wherein the power input connector is disposed on the second surface of the second motherboard, and the power output connector and the first QPI connector are disposed on the same surface of the first motherboard.

9. The server of claim 8, wherein a plurality of supports are disposed on the second surface of the second motherboard, wherein the supports are fixed on the first motherboard, such that the second motherboard is positioned over the first motherboard;
   wherein one of the supports has a hollow structure, and when the support with a hollow structure is fixed on the first motherboard, the second QPI connector and the first QPI connector are connected together in the hollow structure of the support.

* * * * *